(12) United States Patent
Chen

(10) Patent No.: US 6,293,629 B1
(45) Date of Patent: Sep. 25, 2001

(54) BICYCLE WHEEL RIM

(75) Inventor: Chao-Ying Chen, Tainan Hsien (TW)

(73) Assignee: Alex Machine Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 09/544,719

(22) Filed: Apr. 6, 2000

Related U.S. Application Data

(63) Continuation of application No. 09/321,467, filed on May 27, 1999, now Pat. No. 6,089,672.

(51) Int. Cl.$^7$ .................................................. B60B 1/02
(52) U.S. Cl. ................................ 301/58; 301/97; 301/98
(58) Field of Search .................................. 301/58, 97, 98, 301/95, 96, 55, 104, 105.1, 57

(56) References Cited

U.S. PATENT DOCUMENTS

| | | | |
|---|---|---|---|
| 3,732,951 | * 5/1973 | Hata et al. | 301/97 |
| 4,602,665 | * 7/1986 | Sacks | 301/97 |
| 5,499,864 | * 3/1996 | Klein et al. | 301/58 |
| 5,651,591 | * 7/1997 | Mercat et al. | 301/95 |
| 5,653,510 | * 8/1997 | Osborne | 301/95 |
| 6,024,413 | * 2/2000 | Dixon et al. | 301/58 |
| 6,065,812 | * 5/2000 | Lee | 301/95 |
| 6,089,672 | * 7/2000 | Chen | 301/58 |
| 6,120,105 | * 9/2000 | Chern | 301/95 |
| 6,155,651 | * 12/2000 | Mizata et al. | 301/95 |
| 6,186,598 | * 2/2001 | Chen | 301/58 |
| 6,216,758 | * 4/2001 | Chen | 301/95 |

* cited by examiner

*Primary Examiner*—S. Joseph Morano
*Assistant Examiner*—Long Bao Nguyen
(74) *Attorney, Agent, or Firm*—Townsend and Townsend and Crew LLP

(57) ABSTRACT

A bicycle wheel rim is adapted for use with a brake pad and is adapted for mounting a plurality of spokes thereon. The bicycle wheel rim includes spaced left and right annular tire retaining walls adapted for retaining a bicycle tire therebetween. Each of the tire retaining walls has an inner edge portion proximate to a central point of the wheel rim, and an outer edge portion distal to the central point of the wheel rim. Each of the tire retaining walls further has an outer wall surface that has a first width in a radial direction of the wheel rim. The first width is larger than a width of the brake pad in the radial direction of the wheel rim. The outer wall surface is allocated with a brake pad contacting portion that is adapted to contact the brake pad and that has a second width in the radial direction of the wheel rim. The second width ranges from 50 to 60% of the first width. The bicycle wheel rim further includes an annular spoke mounting wall interconnecting the inner edge portions of the tire retaining walls and adapted for mounting the spokes thereat.

2 Claims, 5 Drawing Sheets

BICYCLE WHEEL RIM

CROSS-REFERENCE TO RELATED APPLICATION

This application is a continuation-in-part (CIP) of U.S. Pat. No. 6,089,672, filed by the applicant on May 27, 1999, the entire disclosure of which is incorporated herein by reference.

BACKGROUND OF THE INVENTION

1. Field of the Invention

The invention relates to a bicycle wheel rim, more particularly to a rim of a bicycle wheel that can ensure proper frictional contact with a brake mechanism on a bicycle frame even after adjustment of the wheel axle relative to the bicycle frame has been performed to ensure tight engagement between a drive chain and a chain wheel for driving rotation of the bicycle wheel.

2. Description of the Related Art

Referring to FIG. 1, after a bicycle 1 has been in use for a period of time, the drive chain 11 thereof might become loose and slightly lengthen. At this time, the drive chain 11 might be easily and undesirably released from the chain wheel 120 to result in inconvenience when the bicycle 1 is in use. As such, an adjustment device 13 has been proposed to permit adjustment of the position of the wheel axle 121 of the rear bicycle wheel 12 on the bicycle frame. The adjustment device 13 is mounted on the seat stay 141 and the chain stay 142 of the bicycle frame, and includes a plate member formed with an elongated slot 131 for retaining the wheel axle 121 therein. When the drive chain 11 becomes loose, the wheel axle 121 can be moved along the slot 131 to permit the drive chain 11 to engage fittingly the chain wheel 120.

However, since the brake mechanism 15 of the bicycle 1 is mounted on the seat stay 141, and since the wheel rim 122 of the rear bicycle wheel 12 moves together with the wheel axle 121 during the adjustment operation, unless a corresponding adjustment is made for the brake mechanism 15, the brake pads 151 of the brake mechanism 15 cannot be kept in proper frictional contact with brake pad contacting surfaces formed on the tire retaining walls of the wheel rim 122 after the wheel axle 121 has been moved to an adjusted position, as shown in phantom lines in FIGS. 2 and 3.

In co-pending U.S. patent application Ser. No. 09/321,467, there is disclosed a bicycle wheel rim that is adapted for use with a brake pad having a width in a radial direction of the bicycle wheel rim, and that is adapted for mounting a plurality of spokes thereon. The bicycle wheel rim includes spaced left and right annular tire retaining walls that are adapted for retaining a bicycle tire therebetween. Each of the tire retaining walls has an inner edge proximate to a central point of the wheel rim, an outer edge distal to the central point of the wheel rim, and an intermediate portion between the inner and outer edges. Each of the tire retaining walls further has an outer brake pad contacting surface that has a width in the radial direction of the wheel rim. The width of the brake pad contacting surface of each of the tire retaining walls is at least twice the width of the brake pad. The bicycle wheel rim further includes an annular spoke mounting wall that interconnects the inner edges of the tire retaining walls and that has a central spoke fastening portion which extends along a length of the spoke mounting wall and which is formed with a set of spoke fastening holes adapted for mounting the spokes thereat.

Because the width of the brake pad contacting surface of each of the tire retaining walls is at least twice the width of the brake pad, after the wheel rim moves together with the wheel axle to an adjusted position where the drive chain can engage fittingly the chain wheel, the brake pad can still be kept in proper frictional contact with the brake pad contacting surface of the adjacent tire retaining wall. However, recent advancements in the materials used for fabricating the brake pads and the wheel rim, and in the surface treatment of the brake pad contacting surfaces of the tire retaining walls, have resulted in higher friction coefficients, thereby resulting in a larger braking force per unit area. Thus, the length of the brake pad can be reduced. Under such a condition, the requirement of the width of the brake pad contacting surface of each of the tire retaining walls to be at least twice the width of the brake pad is overestimated.

SUMMARY OF THE INVENTION

Therefore, the object of the present invention is to provide a rim of a bicycle wheel of the type disclosed in the aforesaid co-pending U.S. patent application Ser. No. 09/321,467, that can ensure proper frictional contact with a brake mechanism on a bicycle frame even after adjustment of the wheel axle relative to the bicycle frame has been performed to ensure tight engagement between a drive chain and a chain wheel for driving rotation of the bicycle wheel.

According to the present invention, a bicycle wheel rim is adapted for use with a brake pad and is adapted for mounting a plurality of spokes thereon. The bicycle wheel rim includes spaced left and right annular tire retaining walls adapted for retaining a bicycle tire therebetween. Each of the tire retaining walls has an inner edge portion proximate to a central point of the wheel rim, and an outer edge portion distal to the central point of the wheel rim. Each of the tire retaining walls further has an outer wall surface that has a first width in a radial direction of the wheel rim. The first width is larger than a width of the brake pad in the radial direction of the wheel rim. The outer wall surface is allocated with a brake pad contacting portion that is adapted to contact the brake pad and that has a second width in the radial direction of the wheel rim. The second width ranges from 50 to 60% of the first width. The bicycle wheel rim further includes an annular spoke mounting wall interconnecting the inner edge portions of the tire retaining walls and adapted for mounting the spokes thereat.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
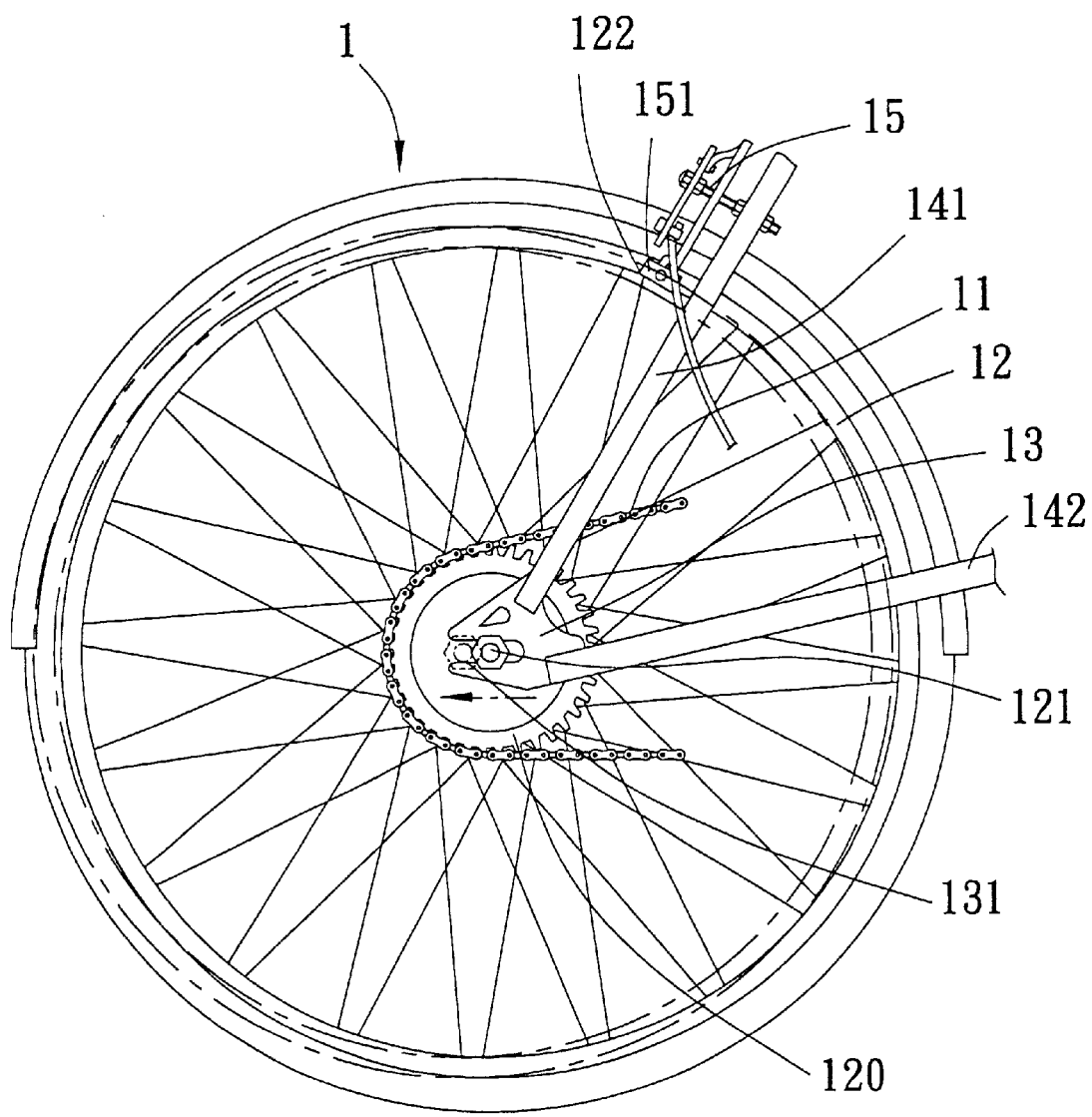
FIG. 1 is a schematic side view illustrating a conventional bicycle wheel rim when in use.
Figure 2:
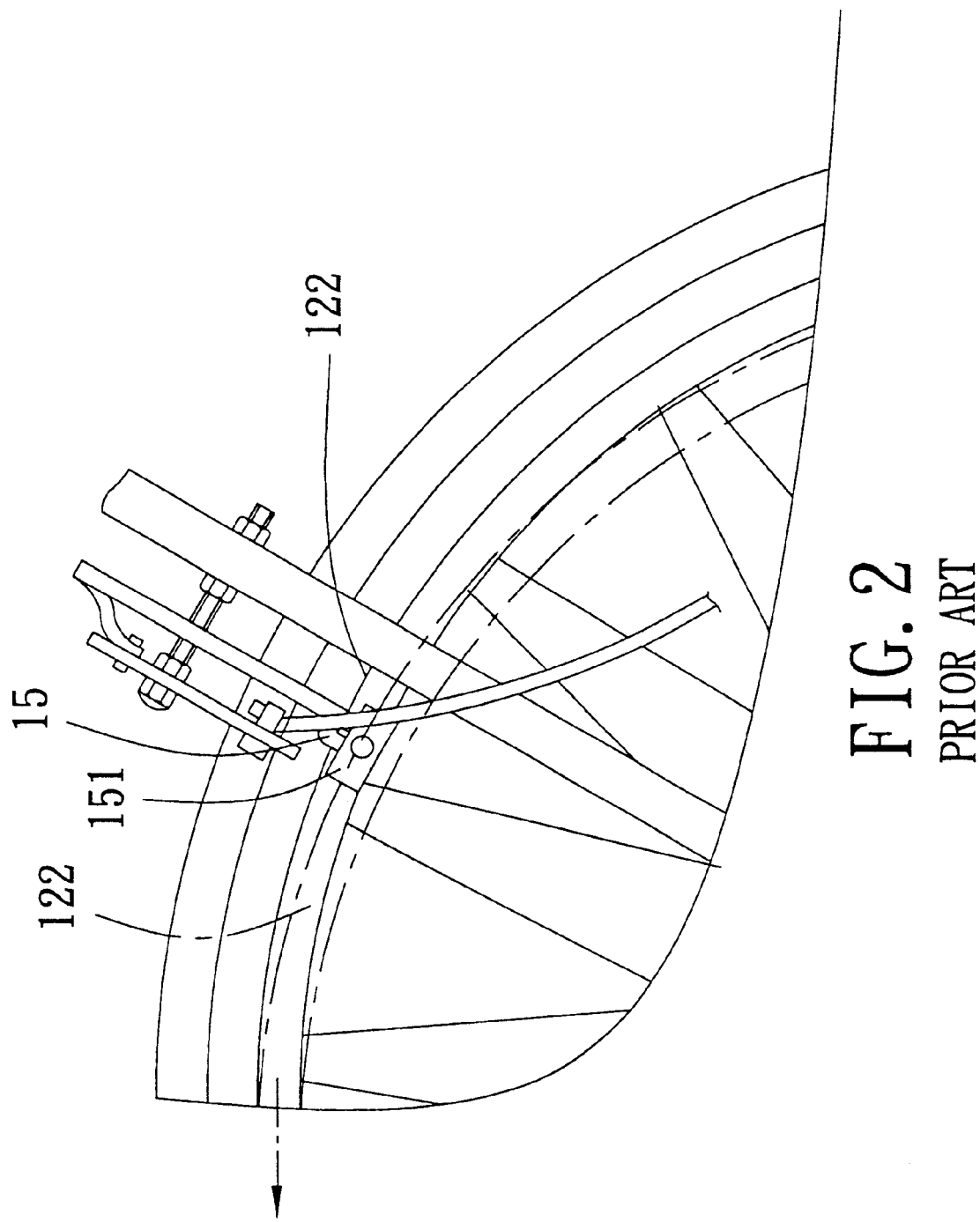
FIG. 2 is an enlarged fragmentary schematic side view of the conventional wheel rim of FIG. 1.
Figure 3:
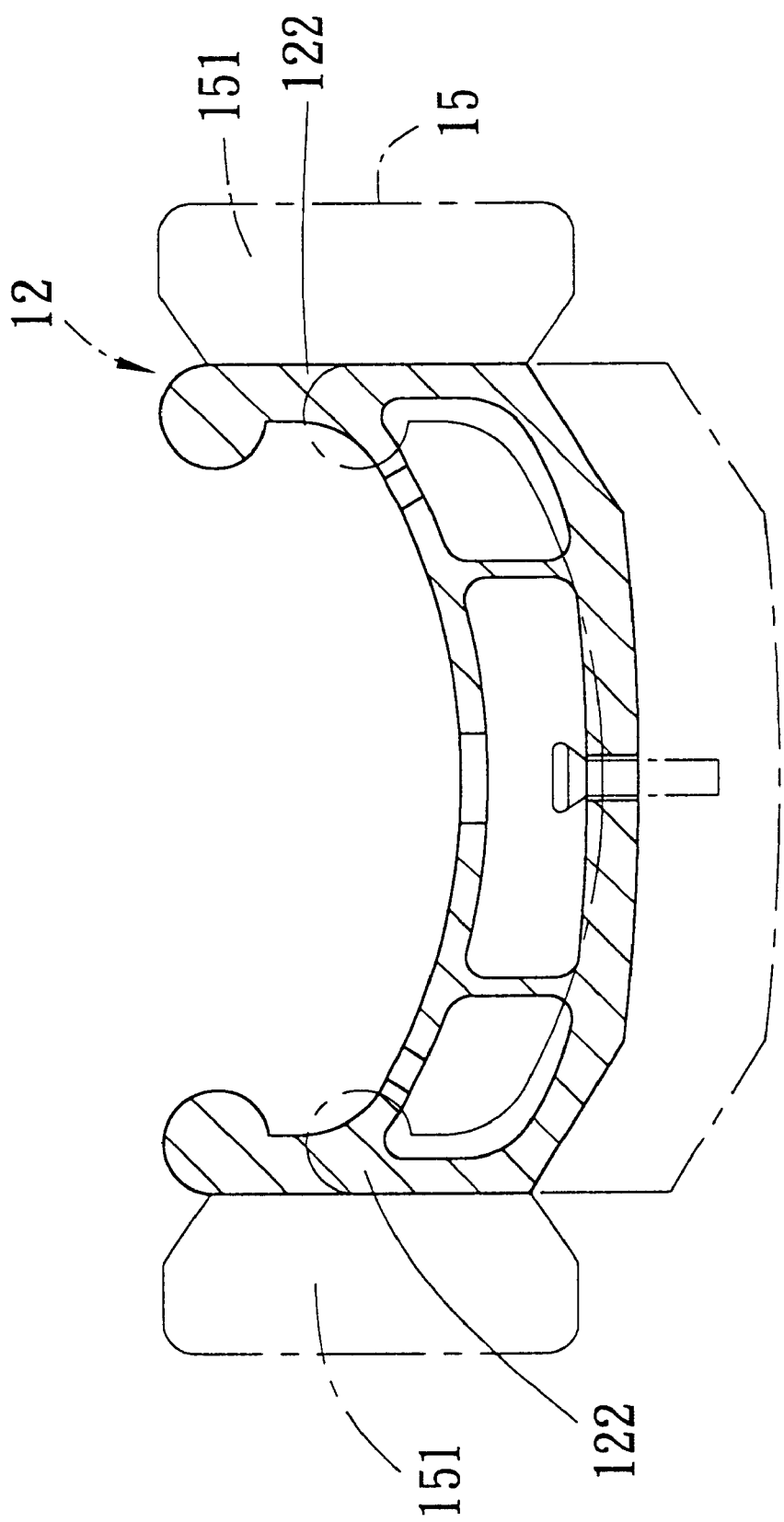
FIG. 3 is a sectional view of the conventional wheel rim of FIG. 1.
Figure 4:
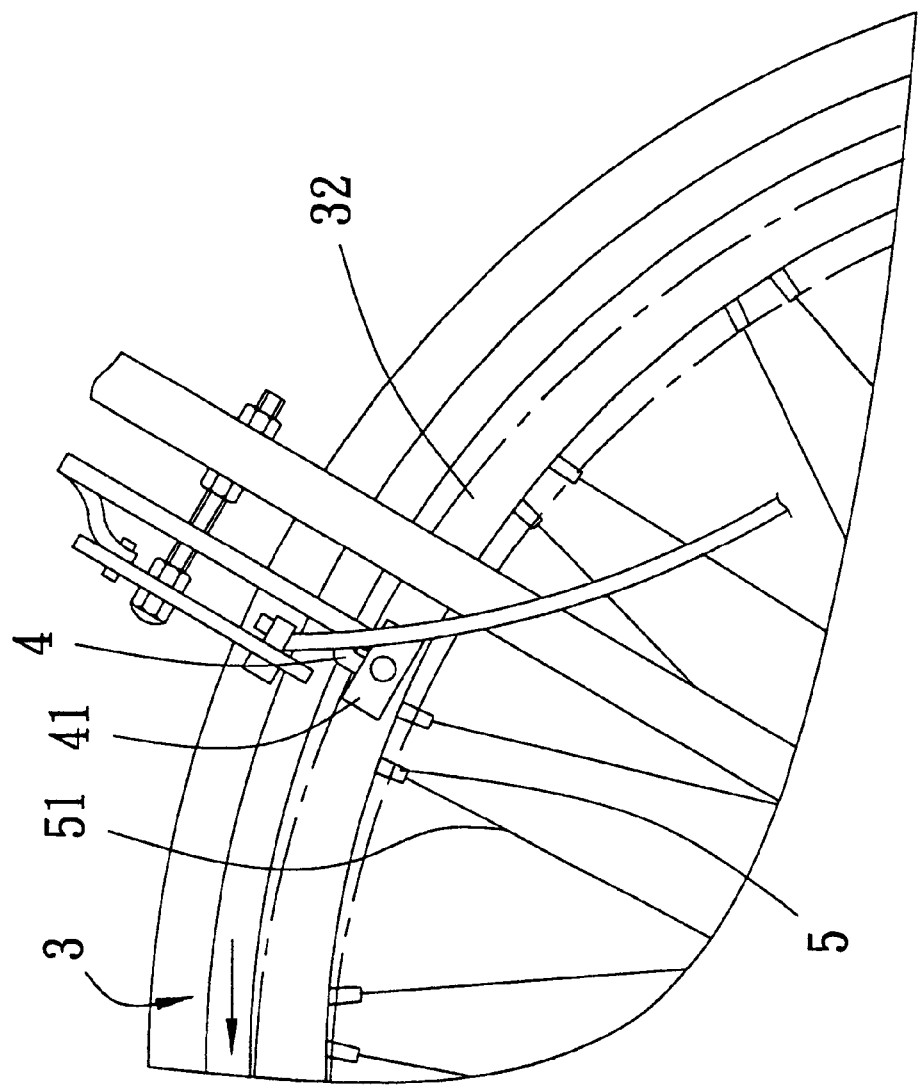
FIG. 4 is an enlarged fragmentary schematic side view of the preferred embodiment of a bicycle wheel rim according to the present invention.
Figure 5:
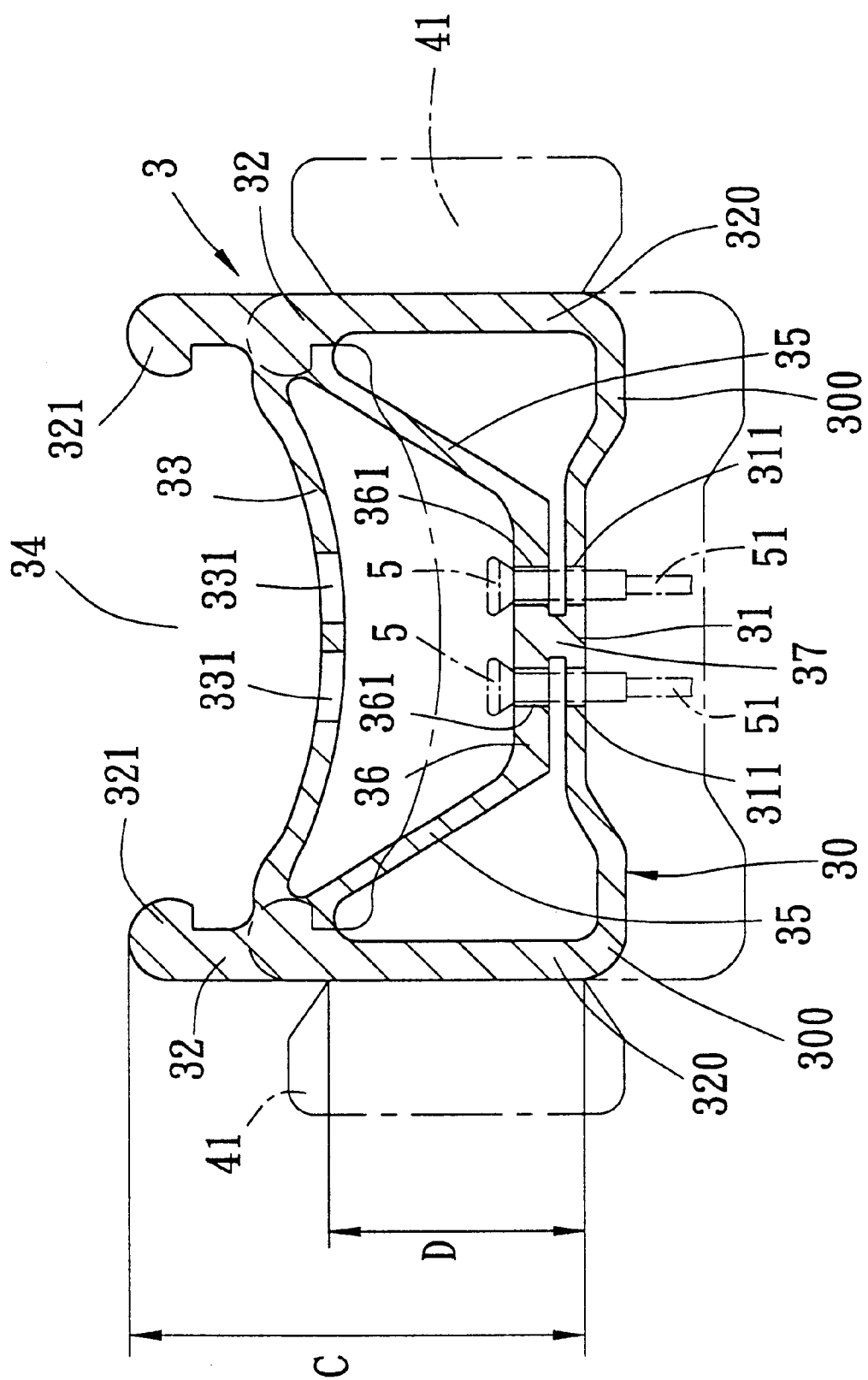
FIG. 5 is a sectional view of the preferred embodiment.

Referring to FIGS. 4 and 5, the preferred embodiment of the bicycle wheel rim 3 of the present invention is adapted for mounting a plurality of spokes 51 thereon by means of spoke fasteners 5, and is shown to include spaced left and right annular tire retaining walls 32, an annular inner spoke mounting wall 30, an annular outer connecting wall 33, and left and right reinforcing walls 35. Each of the tire retaining walls 32 has an inner edge portion 320 proximate to a central point of the bicycle wheel rim 3, and an outer edge portion which is distal to the central point of the bicycle wheel rim 3 and which is formed with a tire retaining flange 321 that projects toward the other one of the tire retaining walls 32.

The spoke mounting wall 30 has a central spoke fastening portion 31, which extends along the length of the spoke mounting wall 30 and which is formed with a set of spoke fastening holes 311 that are adapted for mounting the spoke fasteners 5 thereat. The spoke mounting wall 30 further has left and right end portions 300 on opposite sides of the central spoke fastening portion 31. The spoke fastening portion 31 projects in a radial outward direction of the bicycle wheel rim 3 relative to the left and right end portions 300. Each of the left and right end portions 300 is connected to the inner edge portion 320 of a respective one of the left and right tire retaining walls 32 at a right angle.

The connecting wall 33 is disposed around the spoke mounting wall 30, and has left and right terminating edges connected to intermediate portions of the left and right tire retaining walls 32, respectively. The connecting wall 33 cooperates with the left and right tire retaining walls 32 to define a tire retaining space 34 for retaining a bicycle tire (not shown) between the tire retaining walls 32. The connecting wall 33 has a central portion formed with a plurality of through holes 331 that are aligned respectively with the spoke fastening holes 311 in the spoke mounting wall 30 to permit passage of the spoke fasteners 5 therethrough.

Each of the left and right reinforcing walls 35 has a first end connected to a respective one of the left and right terminating edges of the connecting wall 33, and a second end which extends toward the spoke fastening portion 31 of the spoke mounting wall 30. A bridging wall 36 interconnects the second ends of the left and right reinforcing walls 35, and is parallel to and is spaced apart from the spoke fastening portion 31. A support rib 37 extends in a radial direction of the bicycle wheel rim 3 between the bridging wall 36 and the spoke fastening portion 31 to interconnect the same. The support rib 37 is disposed between two groups of the set of spoke fastening holes 311 in the spoke fastening portion 31. The bridging wall 36 is formed with a plurality of spoke retaining holes 361 which are aligned respectively with the spoke fastening holes 311 in the spoke fastening portion 31.

The bicycle wheel rim 3 is adapted for use with a brake device 4 which includes a brake pad 41 having a width in the radial direction of the bicycle wheel rim 3. Each of the left and right tire retaining walls 32 has an outer wall surface with a width (C) in the radial direction of the bicycle wheel rim 3. The width (C) is larger than the width of the brake pad 41. The outer wall surface of each of the left and right tire retaining walls 32 is allocated with a brake pad contacting portion that is adapted to contact the brake pad 41 and that has a width (D) in the radial direction of the bicycle wheel rim 3. The width (D) ranges from 50 to 60% of the width (C) of the outer wall surface in the radial direction of the bicycle wheel rim 3. With dimensions as such, even after the wheel rim 3 moves together with the wheel axle of the bicycle wheel to an adjusted position where the drive chain can engage fittingly the chain wheel, as shown in phantom lines in FIGS. 4 and 5, the brake pad 41 of the brake device 4 can still be kept in proper frictional contact with the outer wall surface of the adjacent tire retaining wall 32.

During manufacture, the wheel rim 3 is formed by bending a metal strip to form an annular frame, the two ends of which are subsequently connected to retain the shape of the annular frame. The resulting annular frame is then immersed in a liquid electrolyte to form an anodized coating on the surfaces thereof in order to provide protection against corrosion. Thereafter, the spoke fasteners 5 are extended through the holes 331 in the connecting wall 33, the holes 361 in the bridging wall 36, and the holes 311 in the spoke mounting wall 30, and the spokes 51 are secured to the spoke fasteners 5, respectively. An inner lining (not shown) may be provided on the connecting wall 33 for covering the holes 331 before the bicycle tire is disposed in the tire retaining space 34.

As mentioned beforehand, in view of recent advancements in the materials used for fabricating the brake pad 40 and the wheel rim 3, and in the surface treatment of the outer wall surfaces of the tire retaining walls 32, which have resulted in higher friction coefficients and in larger braking forces per unit area, the length of the brake pad 41 is thus shortened. By selecting the width (D) of the brake pad contacting portion in the radial direction of the bicycle wheel rim 3 to range from 50 to 60% of the width (C) of the outer wall surface of the tire retaining wall 32 in the radial direction of the bicycle wheel rim 3, even after the wheel rim 3 moves together with the wheel axle of the bicycle wheel to an adjusted position where the drive chain can engage fittingly the chain wheel, the brake pad 41 can still be kept in proper frictional contact with the outer wall surface of the adjacent tire retaining wall 32.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A bicycle wheel rim adapted for use with a brake pad and adapted for mounting a plurality of spokes thereon, said bicycle wheel rim comprising:

spaced left and right annular tire retaining walls adapted for retaining a bicycle tire therebetween, each of said tire retaining walls having an inner edge portion proximate to a central point of said wheel rim, and an outer edge portion distal to the central point of said wheel rim, each of said tire retaining walls further having an outer wall surface that has a first width in a radial direction of said wheel rim, the first width being larger than a width of the brake pad in the radial direction of said wheel rim, said outer wall surface being allocated with a brake pad contacting portion that is adapted to contact the brake pad and that has a second width in the radial direction of said wheel rim, the second width ranging from 50 to 60% of the first width; and an annular spoke mounting wall interconnecting said inner edge portions of said tire retaining walls and adapted for mounting the spokes thereat.

2. The bicycle wheel rim according to claim 1, wherein said spoke mounting wall is formed with a set of spoke fastening holes that are adapted for mounting the spokes thereat.

\* \* \* \* \*